United States Patent
Brown et al.

(10) Patent No.: US 10,414,966 B2
(45) Date of Patent: Sep. 17, 2019

(54) SETTABLE COMPOSITIONS WITH VARIABLE SET TIMES

(71) Applicant: Halliburton Energy Services, Inc., Houston, TX (US)

(72) Inventors: Paul Alan Brown, Duncan, OK (US); Thomas J. Pisklak, Cypress, TX (US); Darrell Chad Brennies, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/762,075

(22) PCT Filed: Nov. 2, 2015

(86) PCT No.: PCT/US2015/058641
§ 371 (c)(1),
(2) Date: Mar. 21, 2018

(87) PCT Pub. No.: WO2017/078673
PCT Pub. Date: May 11, 2017

(65) Prior Publication Data
US 2018/0273825 A1  Sep. 27, 2018

(51) Int. Cl.
| | |
|---|---|
| *E21B 33/13* | (2006.01) |
| *E21B 33/14* | (2006.01) |
| *C09K 8/42* | (2006.01) |
| *C09K 8/44* | (2006.01) |
| *C09K 8/467* | (2006.01) |
| *C09K 8/487* | (2006.01) |
| *C04B 26/02* | (2006.01) |

(Continued)

(52) U.S. Cl.
CPC ............ *C09K 8/42* (2013.01); *C04B 26/02* (2013.01); *C04B 28/02* (2013.01);
(Continued)

(58) Field of Classification Search
CPC ............ C09K 8/42; C09K 8/44; E21B 33/14
(Continued)

(56) References Cited

U.S. PATENT DOCUMENTS

| | | |
|---|---|---|
| 4,654,802 A | 3/1987 | Davis |
| 5,320,425 A | 6/1994 | Stephenson et al. |

(Continued)

FOREIGN PATENT DOCUMENTS

WO   WO-2010/120523 A2   10/2010

OTHER PUBLICATIONS

International Search Report and Writen Opinion from PCT/US2015/058641, dated Jul. 29, 2016, 19 pages.

*Primary Examiner* — Silvana C Runyan
(74) *Attorney, Agent, or Firm* — Gilliam IP PLLC

(57) ABSTRACT

A settable composition may be designed to thicken at substantially the same time downhole and/or set at substantially the same time downhole independent of when the settable composition was introduced into the wellbore by varying the concentration of set retarders and/or set accelerators during placement of settable compositions. For example, a method may include introducing a settable composition into a wellbore, the settable composition having an initial portion with a first concentration of a set-time additive, a middle portion with a second concentration of a set-time additive, and a final portion with a third concentration of a set-time additive; choosing the first and the third concentrations of the set-time additive so that the initial portion has a longer set-time than the final portion; and thickening the settable, wherein the initial and final portions thicken to exceed a consistency of about 70 Bc within about 3 hours of each other.

17 Claims, 2 Drawing Sheets

(51) Int. Cl.
*C04B 28/02* (2006.01)
*C04B 40/00* (2006.01)

(52) U.S. Cl.
CPC ............ *C04B 40/0032* (2013.01); *C09K 8/44* (2013.01); *C09K 8/467* (2013.01); *C09K 8/487* (2013.01); *E21B 33/13* (2013.01); *E21B 33/14* (2013.01)

(58) Field of Classification Search
USPC ........................................................ 166/295
See application file for complete search history.

(56) References Cited

U.S. PATENT DOCUMENTS

| | | | |
|---|---|---|---|
| 5,613,558 A * | 3/1997 | Dillenbeck, III | C04B 22/068 106/720 |
| 5,988,279 A * | 11/1999 | Udarbe | C04B 24/163 106/696 |
| 7,067,000 B1 * | 6/2006 | Szymanski | C04B 28/02 106/696 |
| 8,327,939 B2 | 12/2012 | Roddy et al. | |
| 2005/0167107 A1 | 8/2005 | Roddy et al. | |
| 2006/0272819 A1 | 12/2006 | Santra et al. | |
| 2008/0115938 A1 | 5/2008 | Bray | |
| 2011/0048711 A1 * | 3/2011 | Lewis | C09K 8/467 166/286 |
| 2012/0210911 A1 | 8/2012 | Tarafdar et al. | |
| 2014/0048267 A1 * | 2/2014 | Pisklak | C04B 40/065 166/292 |
| 2014/0083701 A1 | 3/2014 | Boul et al. | |
| 2014/0090843 A1 * | 4/2014 | Boul | C04B 28/18 166/293 |
| 2014/0367105 A1 * | 12/2014 | Karcher | C09K 8/426 166/295 |

* cited by examiner

SETTABLE COMPOSITIONS WITH VARIABLE SET TIMES

BACKGROUND

The present application relates to manipulating the thickening time and set time of settable compositions during wellbore operations.

Settable compositions like cements and hardenable resin systems may be used in a variety of subterranean applications. For example, when constructing a well, a pipe string (e.g., casing, liners, expandable tubulars, etc.) may be run into a wellbore, and the settable composition is placed in an annular space between the exterior surface of the pipe string and the wellbore. This forms an annular sheath or hardened mass that may support and position the pipe string in the wellbore and bond the exterior surface of the pipe string to the subterranean formation. Among other things, the annular sheath surrounding the pipe string functions to prevent the migration of fluids in the annulus, as well as protecting the pipe string from corrosion. Settable compositions may also be used in remedial methods, for example, to seal cracks or holes in pipe strings or annular sheaths, to seal highly permeable formation zones or fractures, to place a plug, and the like.

Settable compositions often include set time modifiers (e.g., set accelerators and set retarders) that alter the thickening time and set time of the settable composition so that the settable composition can be pumped into place before becoming too thick to pump or setting. Proper setting time of the settable compositions reduces the time and cost associated with wellbore operations. For example, wellbore operations are generally ceased while the settable composition hardens. So, if the settable composition is over-retarded, the set time may be excessive, which is expensive, non-productive time. Further, because the settable composition has not hardened, fluids may infiltrate the settable composition and further delay hardening or reduce the final strength of the hardened mass. In another example, if too much set accelerator is used, the settable composition may harden before it has reached the desired location. Then, expensive wellbore operations to drill out the improperly placed harden mass need to be performed.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
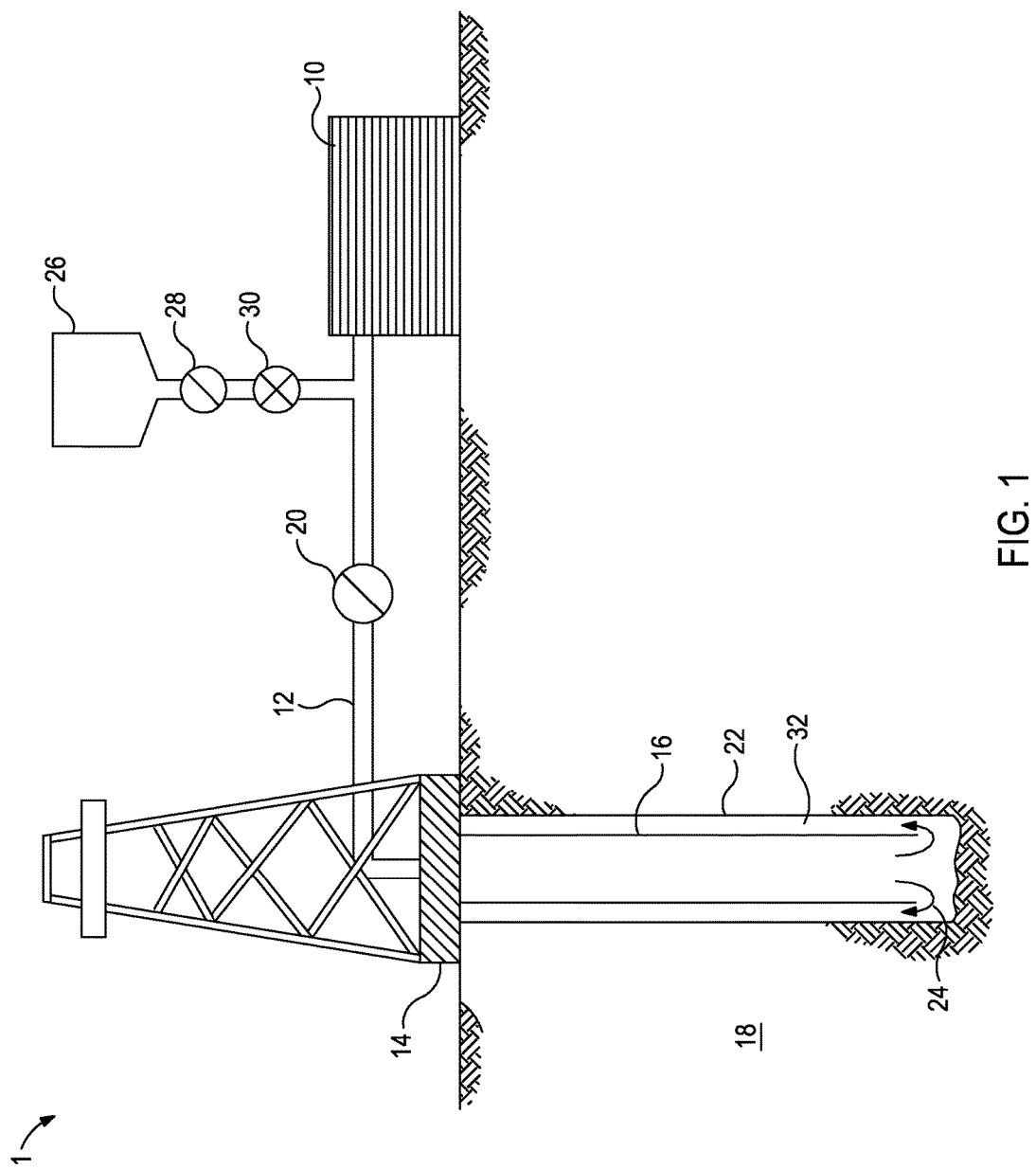
FIG. 1 shows an illustrative schematic of a system that can prepare and deliver settable compositions of the present disclosure to a downhole location.

The present application relates to manipulating the thickening time and set time of settable compositions during wellbore operations.

As used herein, the terms "thicken," "thickened," and grammatical variations thereof refer to a settable composition having reached or exceeded a consistency of 70 Bearden units (Bc). As used herein, the term "downhole thickening time" refers to the time from introduction into the wellbore until the settable composition reaches a consistency of 70 Bc.

As used herein, the terms "set," "setting," "harden," "hardening," and grammatical variations thereof refer to a settable composition having hardened to a compressive strength of 50 psi or greater, unless otherwise specified. Compressive strength may be measured by ASTM C349-14. As used herein, the term "downhole set time" refers to the time from introduction into the wellbore until the settable composition reaches hardens to a compressive strength of 50 psi, unless otherwise specified. The downhole set time may be determined with in-lab experiments that simulate the downhole conditions and measure the compressive strength of the settable composition as it hardens, for example, as described in API Recommended Practice 10B-2 (updated April 2013).

Generally, settable compositions are prepared as a batch and introduced into a wellbore. Because the entire batch of settable composition is a single formulation, the entire settable composition should thicken at the same time and, then, set at the same time. However, the conditions experienced downhole impact the rate of thickening and setting. In many instances, the first portion of the settable composition experiences high downhole temperatures, which accelerates thickening and setting, and then experiences cooler temperatures once placed closer to the surface, which decelerates thickening and hardening. Typically, the settable composition is formulated so that the first portion of the settable composition may be placed before becoming too thick pump. This may involve formulating the settable composition with higher concentrations of set retarders to mitigate faster thickening high downhole temperatures. However, once the first portion of the settable composition is placed uphole, the higher concentration of set retarder and lower temperatures may significantly slow the setting of the first portion of the settable composition. Accordingly, once the settable composition is fully placed, the thickening time and set time is different throughout The embodiments described herein vary the concentration of set retarders and/or set accelerators during placement of settable compositions. As a result, the settable composition may be designed to thicken at substantially the same time downhole and/or set at substantially the same time downhole independent of when the settable composition was introduced into the wellbore. Accordingly, the compositions, methods, and systems described herein may advantageously reduce the time and expense associated with waiting for a settable composition to harden.

FIG. 1 shows an illustrative schematic of a system 1 that can prepare and deliver settable compositions of the present disclosure to a downhole location, according to one or more embodiments. It should be noted that while FIG. 1 generally depicts a land-based system, it is to be recognized that like systems may be operated in subsea and off-shore locations as well.

As depicted in FIG. 1, the system 1 may include mixing tank 10, in which a portion of the settable composition may be formulated. In some embodiments, the mixing tank 10 may represent or otherwise be replaced with a transport vehicle or shipping container configured to deliver or otherwise convey the portion of the settable composition to the well site.

From the mixing tank 10, the settable composition or portion thereof may be conveyed through a portion of the system via line 12. A hopper 26 may be coupled to the line 12 for adding additional components of the settable composition. Between the hopper 26 and the line 12 are a metering pump 28 and a valve 30 to control the amount of the material housed in hopper 26 that is added to the settable composition in line 12. In some embodiments, the hopper 26 may represent or otherwise be replaced with a transport vehicle or shipping container configured to deliver or otherwise convey the component of the settable composition to the well site. Further, the hopper 26 may represent or otherwise be replaced with a tank for fluid components. Further, in some instances, the hopper 26 and mixing tank 10 may be contained on a single transport vehicle or a single mechanical unit/apparatus.

The settable composition or portion thereof may be conveyed via the line 12 to wellhead 14, where the settable composition enters tubular 16 (e.g., a pipe string, a casing, drill pipe, production tubing, coiled tubing, etc.), tubular 16 extending from wellhead 14 into wellbore 22 penetrating subterranean formation 18. Upon being ejected from tubular 16, the settable composition may subsequently return up the wellbore in the annulus 32 between the tubular 16 and the wellbore 22 as indicated by flow lines 24. In other embodiments, the settable composition may be reverse pumped down through the annulus 32 and up tubular 16 back to the surface, without departing from the scope of the disclosure. Pump 20 may be configured to raise the pressure of the settable composition to a desired degree before its introduction into tubular 16 (or annulus 32). It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

It is also to be recognized that the disclosed settable composition may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Figure 2:
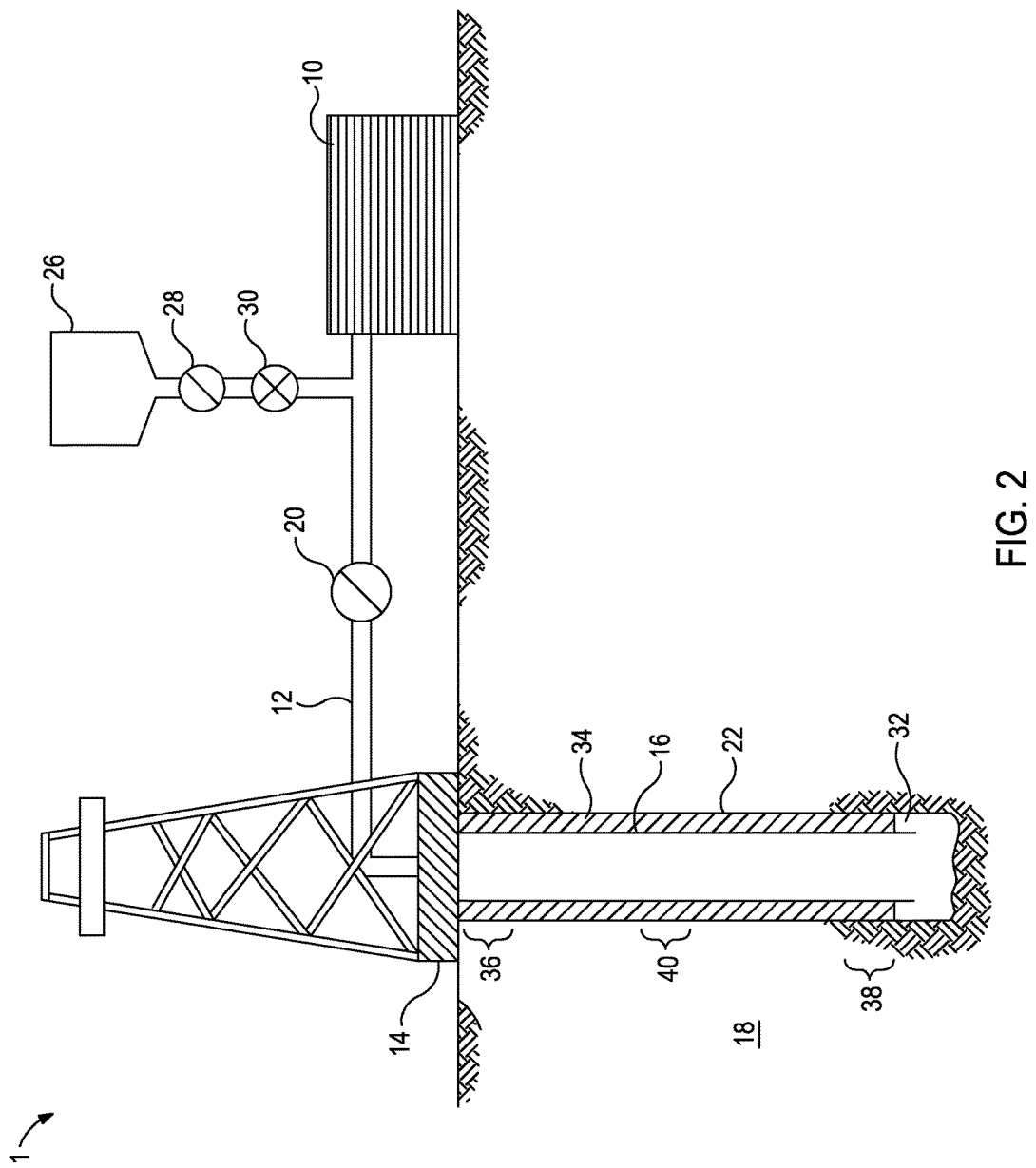
FIG. 2 shows an illustrative schematic of the system of FIG. 1 after the settable composition has been placed in the annulus.

FIG. 2, with continued reference to FIG. 1, shows an illustrative schematic of the system 1 of FIG. 1 after the settable composition 34 has been placed in the annulus 32, according to one or more embodiments of the present disclosure.

Methods of the present disclosure may include introducing a settable composition 34 into a wellbore penetrating a subterranean formation as illustrated in FIG. 1 while adjusting the concentration of a set time modifier in the settable composition 34 such that (1) an initial portion 36 of the settable composition 34 has a longer downhole set time then a final portion 38 of the settable composition and (2) the initial portion 36 and the final portion 38 thicken at approximately the same time and/or set at approximately the same time. In some instances, the settable composition 34 may also be formulated so that a middle portion 40 of the settable composition 34 hardens at approximately the same time as the initial and final portions 36,38 and/or sets at approximately the same time as the initial and final portions 36,38.

As used herein, the term "initial portion" when referring to the settable composition refers to a portion of the settable composition that is within the first 10% by volume of the settable composition introduced into the wellbore. As used herein, the term "final portion" when referring to the settable composition refers to a portion of the settable composition that is within the last 10% by volume of the settable composition introduced into the wellbore. As used herein, the term "middle portion" when referring to the settable composition refers to a portion of the settable composition that is within the middle 20% by volume of the settable composition introduced into the wellbore (that is, the middle portion is the portion placed between 40% of the settable composition introduced by volume and 60% of the settable composition introduced by volume).

In some embodiments, methods may include thickening the settable composition within a portion of the wellbore (e.g., the annulus 32) such that the initial and final portions 36, 38 and optionally the middle portion 40 of the settable composition 34 taken to at least 70 Bc within about three hours, or more preferably about one hour, of each other. Alternatively or in combination with the foregoing thickening, methods may include hardening the settable composition within a portion of the wellbore (e.g., the annulus 32) such that the initial and final portions 36,38 and optionally the middle portion 40 of the settable composition 34 harden to exceed a compressive strength 50 psi (or alternatively harden to exceed a compressive strength of 500 psi) within about three hours, or more preferably about one hour, of each other.

The methods and systems described in FIGS. 1-2 relate to primary cementing operations where the settable composition is placed as described in FIG. 1 and forms a sheath between the tubular 16 and the wellbore 22. Alternatively, the methods, systems, and compositions described herein where the settable composition has a variable formulation that thickens substantially simultaneously and/or hardens substantially simultaneously may be used for or applied to other operations that place settable compositions (e.g., squeeze operations, reverse cementing (e.g., where the settable composition is introduced into the annulus 32 and returns to the wellhead 14 through the tubular 16), and the like). In some instances, the settable composition may flow through the annulus 32 and the tubular 16 without returning to the wellhead 14.

In some embodiments, a settable composition may be a cement slurry comprising water, cement, and at least one set-time additive like basic materials, set retarders, set accelerators, fluid loss additives, dispersants, viscosifiers, and the like.

The water may be fresh water, salt water, seawater, or brine. In some embodiments, the water may be included at about 30% to about 150% by weight of the cement (BWOC).

Suitable subsets of the foregoing range may include, but are not limited to, about 30% to about 100% BWOC, about 30% to about 50% BWOC, about 50% to about 150% BWOC, about 50% to about 100% BWOC, or about 100% to about 150% BWOC.

Examples of cements may include, but are not limited to, Portland cements, pozzolan cements, gypsum cements, high alumina content cements, slag cements, silica cements, magnesia cements (also known as Sorel cements), and any combination thereof. Examples of Portland cements may include, but are not limited to, Portland cements classified as Classes A, C, H, and G according to American Petroleum Institute and their equivalent, Ordinary Portland cements of Type I, I/II, III, and V according to ASTM, including combinations thereof. Examples of pozzolan cements may include, but are not limited to, fly ash, silica fume, granulated blast furnace slag, calcined shale, opaline shale, pumice, pumicite, diatomaceous earth, volcanic ash, tuft, cement kiln dust, and the like, and any combination thereof.

In some embodiments, a cement slurry may further comprise a basic material, which may react with the cement to harden. Generally, increasing concentration of basic materials accelerates thickening and setting (i.e., decreases thickening time and setting time). Examples of basic materials may include, but are not limited to, sodium hydroxide, sodium bicarbonate, sodium carbonate, lime, lime water, and the like, and combinations thereof.

In some embodiments, the basic material may be included at about 1% to about 40% BWOC. Suitable subsets of the foregoing range may include, but are not limited to, about 1% to about 25% BWOC, about 1% to about 10% BWOC, about 10% to about 40% BWOC, about 25% to about 40% BWOC, or about 10% to about 25% BWOC.

Examples of set retarders suitable for use in conjunction with cements may include, but are not limited to, phosphonic acid, phosphonic acid derivatives, salts, organic acids, carboxymethylated hydroxyethylated celluloses, synthetic co- or ter-polymers comprising sulfonate and carboxylic acid groups, ammonium lignosulfonates, metal salts of sulfoalkylated lignins, hydroxycarboxy acids, copolymers that comprise acrylic acid or maleic acid, oligosaccharides, and any combination thereof. One example of a suitable sulfoalkylate lignin comprises a sulfomethylated lignin. Examples of commercially available set retarders include HR® 4 (a calcium lignosulfonate derived from wood), HR® 5 (a chemically modified lignosulfonate), HR® 7 (a sodium lignosulfonate), HR® 12 (a mixture of HR® 4 retarder and an organic acid), HR® 15 (a mixture of HR® 5 retarder and an organic acid), HR® 25 (a high-temperature retarder/intensifier), HR® 601 (a lignin-based, cement-set retarder), SCR™ 100 (a nonlignosulfonate cement retarder), and SCR™ 500 (a synthetic high-temperature retarder), each of which are commercially available from Halliburton Energy Services, Inc.

In some embodiments, the set retarders may be included at about 0.1% to about 5% BWOC. Suitable subsets of the foregoing range may include, but are not limited to, about 0.1% to about 3% BWOC, about 0.1% to about 1% BWOC, about 1% to about 5% BWOC, about 3% to about 5% BWOC, or about 1% to about 3% BWOC.

The concentration of the set retarder in the initial portion of the cement slurry may be lower than the concentration in the final portion. The concentration of the set retarder in the middle portion of the cement slurry may be different than and between the concentrations in the initial and final portions. By way of nonlimiting example, in some instances, the initial portion of the cement slurry may include set retarders at a concentration of about 0.10% to about 1.0% BWOC, and the final portion of the cement slurry may include set retarders at a concentration of about 1.0% to about 2.0% BWOC. Further, in some instances, a middle portion of the cement slurry may include set retarders at a concentration of about 0.50% to about 1.50% BWOC.

Example of cement set accelerators may include, but are not limited to, calcium chloride, triethanolamine, sodium silicate, zinc formate, calcium acetate, sodium sulfate, sodium hexametaphosphate, and any combination thereof. An example of a suitable sodium silicate is ECONOLITE™ additive, commercially available from Halliburton Energy Services, Inc.

In certain embodiments, the set accelerator may be included at about 0.1% to about 10% BWOC. Suitable subsets of the foregoing range may include, but are not limited to, about 0.1% to about 5% BWOC, about 0.1% to about 1% BWOC, about 1% to about 10% BWOC, about 1% to about 5% BWOC, or about 5% to about 10% BWOC.

The concentration of the set accelerator in the initial portion of the cement slurry may be greater than the concentration in the final portion. The concentration of the set accelerator in the middle portion of the cement slurry may be different than and between the concentrations in the initial and final portions. By way of nonlimiting example, in some instances, the initial portion of the cement slurry may include set accelerators at a concentration of about 8.0% to about 10.0% BWOC, and the final portion of the cement slurry may include set accelerators at a concentration of about 0.0% to about 2.0% BWOC. Further, in some instances, a middle portion of the cement slurry may include set accelerators at a concentration of about 4.0% to about 6.0% BWOC.

The presence and concentration of fluid loss additives may affect the thickening rate of the settable composition, where increasing concentrations increase the rate of thickening (i.e., decreases the thickening time). Exemplary fluid loss additives may include, but are not limited to, bentonite, microsilica, asphalt, thermoplastic resins, latex, hydroxyethyl cellulose (HEC), carboxymethyl cellulose (CMC), and carboxymethyl hydroxyethyl cellulose, acrylamide-acrylic acid copolymers (AM/AA), such as acrylamide-sodium acrylate copolymer, binary acrylamide-vinyl imidazole copolymer, ternary acrylamide-2-acrylamido-2-methylpropane sulfonic acid-imidazole copolymer, N,N-dimethylacrylamide-2-acrylamido-2-methylpropane sulfonic acid copolymer, acrylic acid-2-acrylamido-2-methylpropane sulfonic acid copolymer, diallyldimethylammonium chloride-2-acrylamido-2-methylpropane sulfonic acid copolymer, vinyl pyrrolidone copolymers, and the like, and any combination thereof.

In certain embodiments, the fluid loss additives may be included at about 0.1% to about 10% by weight of the settable composition. Suitable subsets of the foregoing range may include, but are not limited to, about 0.1% to about 5% by weight of the settable composition, about 0.1% to about 1% by weight of the settable composition, about 1% to about 10% by weight of the settable composition, about 1% to about 5% by weight of the settable composition, or about 5% to about 10% by weight of the settable composition.

The concentration of the fluid loss additives in the initial portion of the cement slurry may be greater than the concentration in the final portion. The concentration of the fluid loss additives in the middle portion of the cement slurry may be different than and between the concentrations in the initial and final portions. By way of nonlimiting example, in some instances, the initial portion of the cement slurry may include fluid loss additives at a concentration of about 8.0% to about 10.0% BWOC, and the final portion of the cement slurry may include fluid loss additives at a concentration of about 0.0% to about 2.0% BWOC. Further, in some instances, a middle portion of the cement slurry may include fluid loss additives at a concentration of about 6.0% to about 8.0% BWOC.

The presence and concentration of dispersants may affect the thickening rate of the settable composition, where increasing concentrations decrease the rate of thickening (i.e., increases the thickening time). Exemplary dispersants may include, but are not limited to, sodium decylsulfate, sodium lauryl sulfate, alpha olefin sulfonate, alkylether sulfates, alkyl phosphonates, alkane sulfonates, fatty acid salts, arylsulfonic acid salts, trimethylcocoammonium chloride, trimethyltallowammonium chloride, dimethyldicocoammonium chloride, bis(2-hydroxyethyl)tallow amine, bis(2-hydroxyethyl)erucylamine, bis(2-hydroxyethyl)cocoamine, cetylpyridinium chloride, polyoxyethylene (20) cetyl ether, polyoxyethylene (100) stearyl ether, polyoxyethylene (20) oleyl ether, and polyoxyethylene (20) stearyl ether, and the like, and any combination thereof, wherein the number in parentheses corresponds to number of oxyethylene units.

In certain embodiments, the dispersants may be included at about 0.1% to about 5% BWOC. Suitable subsets of the foregoing range may include, but are not limited to, about 0.1% to about 3% BWOC, about 0.1% to about 1% BWOC, about 1% to about 5% BWOC, or about 1% to about 3% BWOC.

The concentration of the dispersants in the initial portion of the cement slurry may be lower than the concentration in the final portion. The concentration of the dispersants in the middle portion of the cement slurry may be different than and between the concentrations in the initial and final portions. By way of nonlimiting example, in some instances, the initial portion of the cement slurry may include dispersants at a concentration of about 0.5% to about 0.75% BWOC, and the final portion of the cement slurry may include dispersants at a concentration of about 2.5% to about 3.0% BWOC. Further, in some instances, a middle portion of the cement slurry may include dispersants at a concentration of about 0.75% to about 2.5% BWOC.

The presence and concentration of viscosifiers may affect the thickening rate of the settable composition, where increasing concentrations increase the rate of thickening (i.e., decrease the thickening time). Exemplary viscosifiers may include, but are not limited to, scleroglucan, carragenans, xanthan, welan, diutan gums, such as available from CP KELCO, celluloses, hydroxyl ethyl celluloses, and combinations thereof. Alternatives may include synthetic polymer viscosifiers, e.g., high molecular weight acrylamide polymers, acrylic acid-acrylamide co-polymers, and acrylamide co-polymers, and combinations thereof.

In certain embodiments, the viscosifiers may be included at about 0.1% to about 10% BWOC. Suitable subsets of the foregoing range may include, but are not limited to, about 0.1% to about 5% BWOC, about 0.1% to about 1% BWOC, about 1% to about 10% by BWOC, about 1% to about 5% BWOC, or about 5% to about 10% BWOC.

The concentration of the viscosifiers in the initial portion of the cement slurry may be lower than the concentration in the final portion. The concentration of the viscosifiers in the middle portion of the cement slurry may be different than and between the concentrations in the initial and final portions. By way of nonlimiting example, in some instances, the initial portion of the cement slurry may include viscosifiers at a concentration of about 0.01% to about 0.02% BWOC, and the final portion of the cement slurry may include viscosifiers at a concentration of about 0.04% to about 0.06% BWOC. Further, in some instances, a middle portion of the cement slurry may include viscosifiers at a concentration of about 0.03% to about 0.04% BWOC.

In some embodiments, a settable composition may be a non-cementitious, hardenable resin composition that includes a liquid hardenable resin, a hardening agent, and optionally at least one set-time additive like filler particles, solvents, accelerators, retarders, and the like.

As used herein, the term "resin" refers to any of a number of physically similar polymerized synthetics or chemically modified natural resins including thermoplastic materials and thermosetting materials. Exemplary liquid hardenable resins may include, but are not limited to, epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, glycidyl ether resins, polyester resins and hybrids and copolymers thereof, polyurethane resins and hybrids and copolymers thereof, acrylate resins, and any combination thereof.

In certain embodiments, the liquid hardenable resin may be included at about 20% to about 90% by weight of the hardenable resin composition. Suitable subsets of the foregoing range may include, but are not limited to, about 20% to about 75% by weight of the hardenable resin composition, about 20% to about 50% by weight of the hardenable resin composition, about 50% to about 90% by weight of the hardenable resin composition, about 75% to about 90% by weight of the hardenable resin composition, or about 50% to about 75% by weight of the hardenable resin composition.

As used herein, the term "hardening agent" refers to any substance capable of transforming the liquid hardenable resin into a hardened, consolidated mass. Exemplary hardening agents may include, but are not limited to, aliphatic amines, aliphatic tertiary amines, aromatic amines, cycloaliphatic amines, heterocyclic amines, amido amines, polyamides, polyethyl amines, polyether amines, polyoxyalkylene amines, carboxylic acids, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, polyethyleneimines, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. Examples of commercially available hardening agents may include, but are not limited to ETHACURE®100 (75%-81% 3,5-diethyltoluene-2,4-diamine, 18%-20% 3,5-diethyltoluene-2,6-diamine, and 0.5%-3% dialkylated m-phenylenediamines, available from Albemarle Corp.) and JEFFAMINE® D-230 (a polyetheramine, available from Huntsman Corp.).

In certain embodiments, the hardening agent may be included at about 1% to about 80% by weight of the liquid hardenable resin. Suitable subsets of the foregoing range may include, but are not limited to, about 1% to about 50% by weight of the liquid hardenable resin, about 1% to about 25% by weight of the liquid hardenable resin, about 10% to about 80% by weight of the liquid hardenable resin, about 25% to about 75% by weight of the liquid hardenable resin, or about 10% to about 50% by weight of the liquid hardenable resin.

The presence and concentration of fillers may affect the thickening rate of the settable composition, where increasing concentrations increase the rate of thickening (i.e., decrease the thickening time). Exemplary fillers may include, but are not limited to, aluminum oxide, awaruite, barium carbonate, barium oxide, barite, calcium carbonate, calcium oxide, chromite, chromium oxide, copper, copper oxide, dolomite, galena, gold, hematite, a hollow glass microsphere, ilmenite, iron oxide, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, Portland cement, pumice, pyrite, spherelite, silica, silver, tenorite, titania, titanium (II) oxide, titanium (III) oxide, titanium (IV) dioxide, zirconium oxide, zirconium silicate, zinc oxide, cement-kiln dust, unexpanded and expanded perlite, attapulgite, bentonite, zeolite, elastomers, sand, and any combination thereof.

In some embodiments, the fillers may be included at about 50% to about 250% by weight of the liquid hardenable resin. Suitable subsets of the foregoing range may include, but are not limited to, about 50% to about 200% by weight of the liquid hardenable resin, about 50% to about 150% by weight of the liquid hardenable resin, about 100% to about 250% by weight of the liquid hardenable resin, about 100% to about 150% by weight of the liquid hardenable resin, or about 150% to about 250% by weight of the liquid hardenable resin.

The concentration of the fillers in the initial portion of the hardenable resin composition may be less than the concentration in the final portion. The concentration of the fillers in the middle portion of the hardenable resin composition may be different than and between the concentrations in the initial and final portions. By way of nonlimiting example, in some instances, the initial portion of the hardenable resin composition may include fillers at a concentration of about 50% to about 100% by weight of the liquid hardenable resin, and the final portion of the hardenable resin composition may include fillers at a concentration of about 150% to about 200% by weight of the liquid hardenable resin. Further, in some instances, a middle portion of the hardenable resin composition may include fillers at a concentration of about 100% to about 150% by weight of the liquid hardenable resin.

The presence and concentration of solvents may affect the thickening and setting rate of the settable composition, where increasing concentrations decrease the rate of thickening and/or the rate of setting (i.e., increase the thickening time and/or increase the set time). Generally, any solvent that is compatible with the liquid hardenable resin and that achieves the desired viscosity effect (e.g., degree of hardening) may be suitable for use in the hardenable resin composition. Exemplary solvents may include, but are not limited to, polyethylene glycol, butyl lactate, dipropylene glycol methyl ether, dipropylene glycol dimethyl ether, dimethyl formamide, diethylene glycol methyl ether, ethyleneglycol butyl ether, diethyleneglycol butyl ether, propylene carbonate, d-limonene, fatty acid methyl esters, reactive diluents, and combinations thereof.

In some embodiments, the solvents may be included at about 0.1% to about 50% by weight of the liquid hardenable resin. Suitable subsets of the foregoing range may include, but are not limited to, about 0.1% to about 25% by weight of the liquid hardenable resin, about 1% to about 10% by weight of the liquid hardenable resin, about 10% to about 50% by weight of the liquid hardenable resin, about 25% to about 50% by weight of the liquid hardenable resin, or about 10% to about 25% by weight of the liquid hardenable resin.

The concentration of the solvents in the initial portion of the hardenable resin composition may be greater than the concentration in the final portion. The concentration of the solvents in the middle portion of the hardenable resin composition may be different than and between the concentrations in the initial and final portions. By way of nonlimiting example, in some instances, the initial portion of the hardenable resin composition may include solvents at a concentration of about 20% to about 30% by weight of the liquid hardenable resin, and the final portion of the hardenable resin composition may include solvents at a concentration of about 0% to about 10% by weight of the liquid hardenable resin. Further, in some instances, a middle portion of the hardenable resin composition may include solvents at a concentration of about 10% to about 20% by weight of the liquid hardenable resin.

The presence and concentration of accelerators may affect the thickening rate of the settable composition, where increasing concentrations increase the rate of thickening (i.e., decrease the thickening time). Exemplary accelerators for use in conjunction with hardenable resin compositions may include, but are not limited to, organic or inorganic acids like maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid ("DDBSA"), phenols, tertiary amines (e.g., 2,4,6-tris(dimethylaminomethyl)phenol, benzyl dimethylamine, and 1,4-diazabicyclo[2.2.2]octane), imidazole and its derivatives (e.g., 2-ethyl,-4-methylimidazole, 2-methylimidazole, and 1-(2-cyanoethyl)-2-ethyl-4-methylimidazole), Lewis acid catalysts (e.g., aluminum chloride, boron trifluoride, boron trifluoride ether complexes, boron trifluoride alcohol complexes, and boron trifluoride amine complexes), and the like, and any combination thereof.

In certain embodiments, the accelerators may be included at about 0.1% to about 20% by weight of the liquid hardenable resin. Suitable subsets of the foregoing range may include, but are not limited to, about 0.1% to about 10% by weight of the liquid hardenable resin, about 0.1% to about 5% by weight of the liquid hardenable resin, about 1% to about 20% by weight of the liquid hardenable resin, about 1% to about 10% by weight of the liquid hardenable resin, about 5% to about 20% by weight of the liquid hardenable resin, or about 10% to about 20% by weight of the liquid hardenable resin.

The concentration of the accelerators in the initial portion of the hardenable resin composition may be greater than the concentration in the final portion. The concentration of the accelerators in the middle portion of the hardenable resin composition may be different than and between the concentrations in the initial and final portions. By way of nonlimiting example, in some instances, the initial portion of the hardenable resin composition may include accelerators at a concentration of about 15% to about 20% by weight of the liquid hardenable resin, and the final portion of the hardenable resin composition may include accelerators at a concentration of about 0% to about 10% by weight of the liquid hardenable resin. Further, in some instances, a middle portion of the hardenable resin composition may include accelerators at a concentration of about 10% to about 15% by weight of the liquid hardenable resin.

Embodiments described herein include Embodiments A-D.

Embodiment A is a method that includes introducing a settable composition into a wellbore penetrating a subterranean formation, wherein the settable composition is placed as an initial portion having a first concentration of a set-time additive, a middle portion having a second concentration of a set-time additive, and a final portion having a third concentration of a set-time additive; setting the first and the third concentrations of the set-time additive such that the initial portion of the settable composition has a longer set-time than the final portion of the settable composition; and thickening the settable composition within the portion of the wellbore, wherein the initial and final portions of the settable composition thicken to exceed a consistency of about 70 Bc within about 3 hours of each other.

Embodiment B is a method that includes introducing a settable composition into a wellbore penetrating a subterranean formation; adjusting a concentration of a set-time additive in the settable composition such that an initial portion of the settable composition has a longer set-time than a final portion of the settable composition; and hardening the settable composition within the portion of the wellbore, wherein the initial and final portions of the settable composition harden to exceed a compressive strength of about 50 psi within about 3 hours of each other. Optionally, Embodiment B may further include that the initial and final portions and a middle portion of the settable composition harden to exceed a compressive strength of about 50 psi within about 3 hours of each other.

Embodiment C is a system that includes a pump fluidly coupled to a tubular extending into a wellbore penetrating a subterranean formation, wherein the tubular is configured to circulate or otherwise convey a settable composition; and the settable composition comprising a set-time additive at a variable concentration sufficient to thicken an initial portion and a final portion of the settable composition to exceed a consistency of about 70 Bc within about 3 hours of each other. Optionally, Embodiment C may further include that the variable concentration is sufficient to thicken the initial portion, a middle portion, and the final portion of the settable composition to exceed a consistency of about 70 Bc within about 3 hours of each other.

Embodiment D is a system that includes a pump fluidly coupled to a tubular extending into a wellbore penetrating a subterranean formation, wherein the tubular is configured to circulate or otherwise convey a settable composition; and the settable composition comprising a set-time additive at a variable concentration sufficient to harden an initial portion and a final portion of the settable composition to exceed a compressive strength of about 50 psi within about 3 hours of each other. Optionally, Embodiment C may further include that the variable concentration is sufficient to harden the initial portion, a middle portion, and the final portion of the settable composition to exceed a compressive strength of about 50 psi within about 3 hours of each other.

Optionally, the foregoing Embodiments A-D may include (unless otherwise already provided for) one or more of the following elements: Element 1: wherein the middle portion of the settable composition thickens to exceed the consistency of about 70 Bc within about 3 hours of the initial and final portions; Element 2: wherein the initial and final portions of the settable composition thicken to exceed the consistency of about 70 Bc within about 1 hour of each other; Element 3: Element 2 and wherein a middle portion of the settable composition thickens to exceed the consistency of about 70 Bc within about 1 hour of the initial and final portions; Element 4: wherein the settable composition is a cement slurry that comprises water, cement, and the set-time additive, wherein the set-time additive comprises a set retarder at a concentration of about 0.1% to about 1.0% by weight of the cement in the initial portion of the cement slurry and about 1.0% to about 2.0% by weight of the cement in the final portion of the cement slurry; Element 5: wherein the settable composition is a cement slurry that comprises water, cement, and the set-time additive, wherein the set-time additive comprises a set accelerator at a concentration of about 8.0% to about 10.0% by weight of the cement in the initial portion of the cement slurry and about 0.0% to about 2.0% by weight of the cement in the final portion of the cement slurry; Element 6: wherein the settable composition is a cement slurry that comprises water, cement, and the set-time additive, wherein the set-time additive comprises a fluid loss additive at a concentration of about 8.0% to about 10.0% by weight of the cement in the initial portion of the cement slurry and about 0.0% to about 2.0% by weight of the cement in the final portion of the cement slurry; Element 7: wherein the settable composition is a cement slurry that comprises water, cement, and the set-time additive, wherein the set-time additive comprises a dispersant at a concentration of about 0.5% to about 0.75% by weight of the cement in the initial portion of the cement slurry and about 2.5% to about 3% by weight of the cement in the final portion of the cement slurry; Element 8: wherein the settable composition is a cement slurry that comprises water, cement, and the set-time additive, wherein the set-time additive comprises a viscosifier at a concentration of about 0.01% to about 0.02% by weight of the cement in the initial portion of the cement slurry and about 0.04% to about 0.06% by weight of the cement in the final portion of the cement slurry; Element 9: wherein the settable composition is a hardenable resin composition that comprises a liquid hardenable resin, a hardening agent, and the set-time additive, wherein the set-time additive comprises filler particles at a concentration of about 50% to about 100% by weight of the liquid hardenable resin in the initial portion of the hardenable resin composition and about 150% to about 200% by weight of the liquid hardenable resin in the final portion of the hardenable resin composition; Element 10: wherein the settable composition is a hardenable resin composition that comprises a liquid hardenable resin, a hardening agent, and the set-time additive, wherein the set-time additive comprises a solvent at a concentration of about 20% to about 30% by weight of the liquid hardenable resin in the initial portion of the hardenable resin composition and about 10% to about 20% by weight of the liquid hardenable resin in the final portion of the hardenable resin composition; Element 11: Element 10 and wherein the middle portion of the hardenable resin composition comprises the solvent at a concentration of about 0% to about 10% by weight of the liquid hardenable resin; Element 12: wherein the settable composition is a hardenable resin composition that comprises a liquid hardenable resin, a hardening agent, and the set-time additive, wherein the set-time additive comprises an accelerator at a concentration of about 15% to about 20% by weight of the liquid hardenable resin in the initial portion of the hardenable resin composition and about 10% to about 15% by weight of the liquid hardenable resin in the final portion of the hardenable resin composition; Element 13: Element 12 and wherein the middle portion of the hardenable resin composition comprises the accelerator at a concentration of about 0% to about 10% by weight of the liquid hardenable resin; Element 14: wherein a middle portion of the settable composition hardens to exceed the compressive strength of about 50 psi within about 3 hours of the initial and final portions; Element 15: wherein the initial and final portions of the settable composition harden to exceed compressive strength of about 50 psi within about 1 hour of each other; and Element 16: Element 15 and wherein a middle portion of the settable composition hardens to exceed the compressive strength of about 50 psi within about 1 hour of the initial and final portions.

Exemplary combinations of the foregoing elements may include, but are not limited to: two or more of Elements 4-8 in combination; two or more of Elements 9-13 in combination; one of Elements 1-3 in combination with one or more of Elements 4-8; one of Elements 1-3 in combination with one or more of Elements 9-13; one of Elements 14-16 in combination with one or more of Elements 4-8 and optionally in further combination with one of Elements 1-3; one of Elements 14-16 in combination with one or more of Elements 9-13 and optionally in further combination with one of Elements 1-3; and one or more of Elements 1-3 in combination with one or more of Elements 14-16.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   introducing a settable composition into a wellbore penetrating a subterranean formation, wherein the settable composition is placed as an initial portion having a first concentration of a set-time additive, a middle portion having a second concentration of a set-time additive, and a final portion having a third concentration of a set-time additive, wherein the initial, the middle, and the final portions correspond to different locations of the wellbore;
   setting the first and the third concentrations of the set-time additive such that the initial portion of the settable composition has a longer set-time than the final portion of the settable composition; and
   thickening the settable composition within the wellbore, wherein the initial and final portions of the settable composition thicken to exceed a consistency of about 70 Bearden units (Bc) within about 3 hours of each other.

2. The method of claim 1, wherein the middle portion of the settable composition thickens to exceed the consistency of about 70 Bc within about 3 hours of the initial and final portions.

3. The method of claim 1, wherein the initial and final portions of the settable composition thicken to exceed the consistency of about 70 Bc within about 1 hour of each other.

4. The method of claim 3, wherein the middle portion of the settable composition thickens to exceed the consistency of about 70 Bc within about 1 hour of the initial and final portions.

5. The method of claim 1, wherein the settable composition is a cement slurry that comprises water, cement, and the set-time additive, wherein the set-time additive comprises a set retarder at a concentration of about 0.1% to about 1.0% by weight of the cement in the initial portion of the cement slurry and about 1.0% to about 2.0% by weight of the cement in the final portion of the cement slurry.

6. The method of claim 1, wherein the settable composition is a cement slurry that comprises water, cement, and the set-time additive, wherein the set-time additive comprises a set accelerator at a concentration of about 8.0% to about 10.0% by weight of the cement in the initial portion of the cement slurry and about 0.0% to about 2.0% by weight of the cement in the final portion of the cement slurry.

7. The method of claim 1, wherein the settable composition is a cement slurry that comprises water, cement, and the set-time additive, wherein the set-time additive comprises a fluid loss additive at a concentration of about 8.0% to about 10.0% by weight of the cement in the initial portion of the cement slurry and about 0.0% to about 2.0% by weight of the cement in the final portion of the cement slurry.

8. The method of claim 1, wherein the settable composition is a cement slurry that comprises water, cement, and the set-time additive, wherein the set-time additive comprises a dispersant at a concentration of about 0.5% to about 0.75% by weight of the cement in the initial portion of the cement slurry and about 2.5% to about 3% by weight of the cement in the final portion of the cement slurry.

9. The method of claim 1, wherein the settable composition is a cement slurry that comprises water, cement, and the set-time additive, wherein the set-time additive comprises a viscosifier at a concentration of about 0.01% to about 0.02% by weight of the cement in the initial portion of the cement slurry and about 0.04% to about 0.06% by weight of the cement in the final portion of the cement slurry.

10. The method of claim 1, wherein the settable composition is a hardenable resin composition that comprises a liquid hardenable resin, a hardening agent, and the set-time additive, wherein the set-time additive comprises filler particles at a concentration of about 50% to about 100% by weight of the liquid hardenable resin in the initial portion of the hardenable resin composition and about 150% to about 200% by weight of the liquid hardenable resin in the final portion of the hardenable resin composition.

11. The method of claim 1, wherein the settable composition is a hardenable resin composition that comprises a liquid hardenable resin, a hardening agent, and the set-time additive, wherein the set-time additive comprises a solvent at a concentration of about 20% to about 30% by weight of the liquid hardenable resin in the initial portion of the hardenable resin composition and about 10% to about 20% by weight of the liquid hardenable resin in the final portion of the hardenable resin composition.

12. The method of claim 11, wherein the middle portion of the hardenable resin composition comprises the solvent at a concentration of about 0% to about 10% by weight of the liquid hardenable resin.

13. The method of claim 1, wherein the settable composition is a hardenable resin composition that comprises a liquid hardenable resin, a hardening agent, and the set-time additive, wherein the set-time additive comprises an accelerator at a concentration of about 15% to about 20% by weight of the liquid hardenable resin in the initial portion of the hardenable resin composition and about 10% to about 15% by weight of the liquid hardenable resin in the final portion of the hardenable resin composition.

14. The method of claim 13, wherein the middle portion of the hardenable resin composition comprises the accelerator at a concentration of about 0% to about 10% by weight of the liquid hardenable resin.

15. A method comprising:
   introducing a settable composition into a wellbore penetrating a subterranean formation, wherein the settable composition comprises an initial portion having a first concentration of a set-time additive and a final portion having a second concentration of a set-time additive, wherein the initial and the final portions correspond to different locations of the wellbore;
   adjusting the first and the second concentrations of set-time additive such that the initial portion of the settable composition has a longer set-time than the final portion of the settable composition; and
   hardening the settable composition within the wellbore, wherein the initial and final portions of the settable composition harden to exceed a compressive strength of about 50 pounds per square inch (psi) within about 3 hours of each other, and wherein a middle portion of the settable composition hardens to exceed the compressive strength of about 50 psi within about 3 hours of the initial and final portions.

16. The method of claim 15, wherein the initial and final portions of the settable composition harden to exceed compressive strength of about 50 psi within about 1 hour of each other.

17. The method of claim 16, wherein a middle portion of the settable composition hardens to exceed the compressive strength of about 50 psi within about 1 hour of the initial and final portions.

* * * * *